(12) United States Patent
Huang

(10) Patent No.: US 11,694,471 B2
(45) Date of Patent: Jul. 4, 2023

(54) BIOMETRIC IDENTIFICATION APPARATUS AND BIOMETRIC IDENTIFICATION METHOD USING THE SAME

(71) Applicant: SHANGHAI HARVEST INTELLIGENCE TECHNOLOGY CO., LTD., Shanghai (CN)

(72) Inventor: Jiandong Huang, Shanghai (CN)

(73) Assignee: SHANGHAI HARVEST INTELLIGENCE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/509,261

(22) Filed: Oct. 25, 2021

(65) Prior Publication Data

US 2022/0043999 A1 Feb. 10, 2022

Related U.S. Application Data

(63) Continuation-in-part of application No. 16/771,095, filed as application No. PCT/CN2018/120503 on Dec. 12, 2018, now Pat. No. 11,157,715.

(30) Foreign Application Priority Data

Dec. 13, 2017 (CN) .......................... 201711328640.5

(51) Int. Cl.
*G06V 40/13* (2022.01)
*G09G 3/32* (2016.01)
(Continued)

(52) U.S. Cl.
CPC ........ *G06V 40/1324* (2022.01); *G06F 3/0412* (2013.01); *G06F 21/32* (2013.01); *G09G 3/32* (2013.01); *G09G 2360/145* (2013.01)

(58) Field of Classification Search
CPC . G09G 2360/145; G06F 3/04166; G06F 3/32; G06V 40/1318; G06V 40/1324
See application file for complete search history.

(56) References Cited

U.S. PATENT DOCUMENTS

2016/0247010 A1 8/2016 Huang et al.
2018/0005006 A1 1/2018 Chai et al.
(Continued)

FOREIGN PATENT DOCUMENTS

CN 107275376 A 10/2017
CN 107430681 A 12/2017
(Continued)

OTHER PUBLICATIONS

International Search Report (PCT/ISA/210) issued in PCT/CN2018/120503 dated Mar. 13, 2019.
(Continued)

*Primary Examiner* — Stephen G Sherman
(74) *Attorney, Agent, or Firm* — Birch, Stewart, Kolasch & Birch, LLP

(57) ABSTRACT

A biometric identification apparatus is provided to include a light-transmissible plate, a light filtering module, a display member and a photodetection member. The display member is configured to emit light, and the light is reflected by a surface of the light-transmissible plate and formed as an original reflected light. The light filtering module is configured to filter the original reflected light to obtain a light with a traveling direction in a predetermined angle range, and the photodetection member is configured to receive the light filtered by the light filtering module.

22 Claims, 9 Drawing Sheets

(51) Int. Cl.
G06F 3/041 (2006.01)
G06F 21/32 (2013.01)

(56) References Cited

U.S. PATENT DOCUMENTS

| | | |
|---|---|---|
| 2018/0012069 A1* | 1/2018 | Chung ............... G06V 40/1365 |
| 2018/0046837 A1 | 2/2018 | Gozzini et al. |
| 2018/0268194 A1 | 9/2018 | Lin et al. |
| 2019/0165299 A1 | 5/2019 | Bookbinder et al. |
| 2020/0402448 A1 | 12/2020 | Huang |
| 2021/0073506 A1 | 3/2021 | Huang |

FOREIGN PATENT DOCUMENTS

| | | | |
|---|---|---|---|
| WO | WO 2016/205832 A1 | 12/2016 | |
| WO | WO-2017188715 A2 * | 11/2017 | ........... G06K 9/0004 |

OTHER PUBLICATIONS

Written Opinion (PCT/ISA/237) issued in PCT/CN2018/120503 dated Mar. 13, 2019.

* cited by examiner

BIOMETRIC IDENTIFICATION APPARATUS AND BIOMETRIC IDENTIFICATION METHOD USING THE SAME

CROSS REFERENCE TO RELATED APPLICATIONS

The present application is a continuation-in-part (CIP) application of U.S. application Ser. No. 16/771,095, filed on Jun. 9, 2020, which is a National Phase Application of PCT Patent Application No. PCT/CN2018/120503 filed on Dec. 12, 2018, which claims the benefit of priority from Chinese Patent Application No. 201711328640.5 filed on Dec. 13, 2017, the entirety of which is incorporated herein by reference.

FIELD

The disclosure relates to biometric identification, and more particularly to a biometric identification apparatus and a biometric identification method using the biometric identification apparatus.

BACKGROUND

A conventional display apparatus, such as a liquid crystal display (LCD) apparatus or an active matrix organic light emitting display (AMOLED) apparatus, includes a plurality of thin-film transistors (TFTs) and a plurality of pixels that are arranged in an array. Each of the pixels is driven by a respective one of the TFTs for displaying an image. Each of the TFTs is generally a metal-oxide-semiconductor field-effect transistor (MOSFET) that includes a semiconductor layer made from a semiconductor material such as amorphous silicon, polycrystalline silicon, indium gallium zinc oxide (IGZO), a nanocarbon material-mixed organic material, and combinations thereof. Since photodiodes may be manufactured using the above semiconductor material and production equipment of the photodiodes is incorporable into production equipment of the TFTs array, a photodetection device including a plurality of photodiodes and a plurality of TFTs, both of which are arranged in an array, can be manufactured using the production equipment of the TFTs array. The photodiodes have a structure such as those disclosed in U.S. Pat. No. 6,943,070 B2 and Chinese Utility Model Patent No. CN 204808361 U. The structural difference between the photodetection device thus formed and the conventional display apparatus resides in that the aperture area of the pixels of the display apparatus is modified into photodetection area of the photodetection device. As mentioned in U.S. Pat. No. 6,943,070 B2, the photodetection device may use a thinned glass substrate or a heat-resistant plastic substrate. The photodetection device thus formed is applicable to different fields, such as an X-ray flat panel detector as disclosed in Chinese Invention Patent Publication No. CN 103829959 B, and an X-ray image sensing element and an X-ray image sensing module including the same as disclosed in Chinese Invention Patent Publication No. CN 102903721 B.

Compared with image-sensing devices made from conventional crystalline materials, the above semiconductor material for making the photodiodes of the above photodetection device has a band gap for mainly absorbing visible light. However, the above photodetection device, which includes the photodiodes made from the semiconductor material, is susceptible to interference from environmental visible light and has a relatively low signal-to-noise ratio (SNR), Hence, the application of the above photodetection device focuses primarily on the technical aspects of X-ray detection or sensing, such as the abovementioned X-ray flat panel detector and X-ray image sensing element and sensing module. For alleviating the interference from the environmental visible light, the X-ray flat panel detector and the X-ray image sensing element and sensing module mentioned above include at least one fluorescent layer or flickering layer for converting an incident X-ray light, which has a relatively short wavelength and a relatively high collimation, to the visible light. The visible light subsequently emits on the photodiodes.

The integration of the above photodetection device with the conventional display apparatus has been contemplated so as to realize the display apparatus with a photodetection function, hereinafter referred to as a conventional photodetection display apparatus. However, due to limitations of a pixel aperture ratio of the conventional photodetection display apparatus, an image generated from the light detected by the photodiodes is distorted because of optical diffraction. Besides, an incident light has to pass through multiple layers of the conventional photodetection display apparatus before being detected by the photodiodes. Thus, it is difficult to abstract useful optical signals from the environment inside the photodetection display apparatus, where the signal-to-noise ratio is relatively low and where both electrical signals, which are generated by the photodiodes from optical signals received, and sensing signals, which are generated by a touch panel from touching signals received, are present. The difficulty in abstracting the useful optical signals is approximately equal to that of single-photon imaging. Resolution of an original image generated by the electrical signals requires reconstruction through an algorithm on the basis of an optic theory. In order to deal with the difficulty of optical-signal abstraction, it is proposed to further dispose an optical reinforcing member in the conventional photodetection display apparatus or to dispose the photodiodes on a side of a display unit, such as a display module disclosed in Chinese Invention Patent Publication No. 101359369 B, so as to reconstruct the image based on light that is not vertically incident on the side of the display unit. However, arrangement of the above optical reinforcing member disadvantageously increases a thickness of a display panel portion of the conventional photodetection display apparatus, and arrangement of the photodiodes lateral to the display unit disadvantageously limits a user's full-screen experience.

Referring to FIG. 1, a conventional touch display device 91 applicable to the conventional photodetection display apparatus includes a light-emitting diode (LED) unit 92 including a plurality of spaced-apart LED elements 921, a touch screen 910 disposed on the LED unit 92, and a cover glass plate 911 disposed on the touch screen 910. A photodetection film 93 may be disposed beneath the touch display device 91 so as to impart biometric function to the conventional photodetection display apparatus to identify a user's physiological characteristics, such as fingerprints.

When the cover glass plate 911 is touched with a finger of an object to be identified, light emitted from the LED unit 92 will irradiate on the finger after passing through the cover glass plate 911, and optical signals will be generated from the light reflected off of the finger and back to the cover glass plate 911. The optical signals respectively correspond to friction ridges and grooves of the fingerprints of the finger of the object to be identified. However, since multiple optical phenomena, such as transmittance, reflection or refraction, will simultaneously occur at a top surface of the cover glass plate 911, effective optical signals are weak, and the correspondence between the effective optical signals and the friction ridges and the grooves of the fingerprints is poor.

Furthermore, even if the optical signals have an initial intensity that is sufficient for identification of the fingerprints, the optical signals still have to pass through the cover glass plate 911, the touch screen 910 and the LED unit 92 before arriving at the photodetection film 93. Hence, the intensity of the optical signals received by the photodetection film 93 is greatly reduced, generally by more than 95%. Meanwhile, optical distortion of the optical signals may occur when the optical signals are transmitted through apertures of TFTs of the LED unit 92 and may adversely affect the collection of fingerprint information. Moreover, since the light emitted from each of the LED elements 921 of the LED unit 92 has a relatively broad range of emitting-angle, collimation of the light emitted from the LED elements 921 is relatively low. Thus, beams of the light emitted from one of the LED elements 921 may interfere with each other, which may also adversely affect the collection of the fingerprint information.

SUMMARY

A biometric identification apparatus is provided to solve the above drawbacks of the prior art. A biometric identification method using the biometric identification apparatus is also provided.

According to one aspect of the disclosure, a biometric identification apparatus includes a light-transmissible plate, a light filtering module, a display member and a photodetection member. The display member is configured to emit light, and the light is reflected off of a surface of the light-transmissible plate to form an original reflected light. The light filtering module is configured to filter the original reflected light to obtain a light with a traveling direction in a predetermined angle range, and the photodetection member is configured to receive the light filtered by the light filtering module.

In some embodiments, the light filtering module includes an optical member. The optical member is configured to filter out a portion of the original reflected light with an incidence angle on a surface of the optical member smaller than a second critical angle, so as to obtain a second reflected light. The second reflected light is received by the photodetection member, and the second critical angle is a minimum incident angle at which the light emitted by the display member is totally reflected by the surface of the light-transmissible plate.

In some embodiments, the surface of the light-transmissible plate is configured to be touched with an object to be identified.

In some embodiments, the light filtering module includes a first optical member and a second optical member. The first optical member is configured to filter out a portion of the original reflected light with an incidence angle on a surface of the first optical member greater than a first critical angle, so as to obtain a first reflected light. The first critical angle is a minimum incident angle at which the original reflected light is totally reflected by the surface of the first optical member. The second optical member is configured to filter out a portion of the first reflected light with an incidence angle on a surface of the second optical member smaller than a second critical angle, so as to obtain a second reflected light. The second critical angle is a minimum incident angle at which the light emitted by the display member is totally reflected by the surface of the light-transmissible plate.

In some embodiments, the surface of the first optical member is an interface between the first optical member and the display member.

In some embodiments, the surface of the second optical member is an interface between the first optical member and the second optical member.

In some embodiments, the light filtering module includes an optical member. The optical member is configured to filter out a portion of the original reflected light with an incidence angle on a surface of the optical member greater than a first critical angle, so as to obtain a first reflected light. The first reflected light is received by the photodetection member, and the first critical angle is a minimum incident angle at which the original reflected light is totally reflected by the surface of the optical member.

In some embodiments, the surface of the optical member is an interface between the optical member and the display member.

In some embodiments, the optical member is selected from a shielding-type optical element and a phase variation optical element. The shielding-type optical element is selected from a periodical pinhole array and a non-periodical pinhole array. The phase variation optical element has a structure selected from a photonic crystal structure with a refractive index varied periodically, a microlens array structure with a refractive index varied periodically, an incident light-scattered crystal structure with a refractive index varied non-periodically, and an incident light-diffused crystal structure with a refractive index varied non-periodically. Alternatively, the optical member is designed according to digital holography.

In some embodiments, the second optical member is selected from a shielding-type optical element and a phase variation optical element. The shielding-type optical element is selected from a periodical pinhole array and a non-periodical pinhole array. The phase variation optical element having a structure selected from a photonic crystal structure with a refractive index varied periodically, a microlens array structure with a refractive index varied periodically, an incident light-scattered crystal structure with a refractive index varied non-periodically, and an incident light-diffused crystal structure with a refractive index varied non-periodically. Alternatively, the second optical member is designed according to digital holography, and the first optical member includes an optical adhesive layer.

In some embodiments, the optical member includes an optical adhesive layer.

In some embodiments, the biometric identification apparatus further includes a processing circuitry. The processing circuitry is configured to generate physiological characteristic image information according to the light received by the photodetection member.

In some embodiments, the display member includes a plurality of display pixels, and the processing chip is configured to reconstruct a physiological characteristics image based on the second reflected light signal received by the photodetection member, and the second reflected light signal is corresponding to the light emitted by one or more of a plurality of groups of single display pixels of the display member or one or more of a plurality of groups of display pixel arrays of the display member.

In some embodiments, either each group of single display pixels or each group of display pixel arrays includes multiple display loudness.

In some embodiments, the photodetection member includes a plurality of photodetection regions arranged in an array, and each of the plurality of photodetection regions is provided with a pixel thin film circuit and a photodetection sensor.

In some embodiments, the photodetection sensor includes a photodetection transistor, the photodetection transistor includes a source, a drain and a semiconductor layer, a leakage current channel is formed between the source and the drain, and the semiconductor layer is disposed in the leakage current channel.

A biometric identification method using the abovementioned biometric identification apparatus is provided. The method includes: driving the display member to emit light toward the surface of the light-transmissible plate when the surface of the light-transmissible plate is touched with an object to be identified; and outputting image data corresponding to the object to be identified.

As compared with the prior art, the approach in the present disclosure includes the following advantages.

The biometric identification apparatus includes a light filtering module, and the light filtering module is configured to filter the original reflected light to obtain a light with a traveling direction in a predetermined angle range, and the photodetection member is configured to receive the light filtered by the light filtering module. Therefore, the preferred portion of the ray of the incident light emitted by the display member is selected and received by the photodetection member, which has a relatively high accuracy for detecting the object's physiological characteristics.

Further, the light filtering module includes an optical member, the optical member is configured to filter out a portion of the original reflected light with an incidence angle on a surface of the optical member smaller than a second critical angle, so as to obtain a second reflected light. The second reflected light is received by the photodetection member, and the second critical angle is a minimum incident angle at which the light emitted by the display member is totally reflected by the surface of the light-transmissible plate. When the top incident angle of the initial light irradiating on the surface of the light-transmissible plate is much smaller than the second critical angle, a total reflection will not occur on the interface between the light-transmissible plate and the object to be detected and identified, so the intensity of a photodetection member incident light entering the photodetection member will be too small to effectively detect the object's physiological characteristics. Hence, for effective detection of the object's physiological characteristics (i.e., the fingerprints of the object's finger), the optical member can filter out the portion of the original reflected light with weak intensity.

Further, the light filtering module includes an optical member which is configured to filter out a portion of the original reflected light with an incidence angle on a surface of the optical member greater than a first critical angle, so as to obtain a first reflected light. The first reflected light is received by the photodetection member and the first critical angle is a minimum incident angle at which the original reflected light is totally reflected by the surface of the optical member. Since the light path of the portion of the ray of the initial light that is emitted from the display member and forms an optical member incident light entering the optical member at a first incident angle greater than the inner critical angle will be disadvantageously long and impractical for detecting the object's physiological characteristic. Therefore, the portion of the optical member incident light that enters the optical member at the first incident angle greater than the first critical angle is designed to be filtered out by the optical member, and the first reflected light with a relatively high accuracy is selected for detecting the object's physiological characteristics.

Further, the light filtering module may include a first optical member and a second optical member. The first optical member is configured to filter out a portion of the original reflected light with an incidence angle on a surface of the first optical member greater than a first critical angle, so as to obtain a first reflected light, and the first critical angle is a minimum incident angle at which the original reflected light is totally reflected by the surface of the first optical member. The second optical member is configured to filter out a portion of the first reflected light with an incidence angle on a surface of the second optical member smaller than a second critical angle, so as to obtain a second reflected light, and the second critical angle is a minimum incident angle at which the light emitted by the display member is totally reflected by the surface of the light-transmissible plate. Therefore, the preferred portion of the original reflected light which has a relatively high accuracy for detecting the object's physiological characteristics is defined by the second critical angle and the first critical angle.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
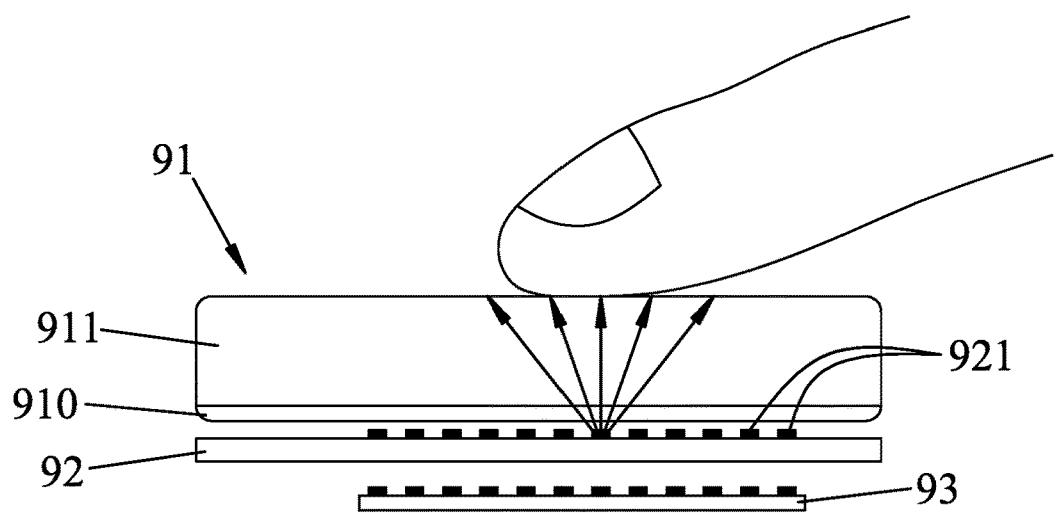
FIG. 1 is a schematic view illustrating a conventional touch display device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
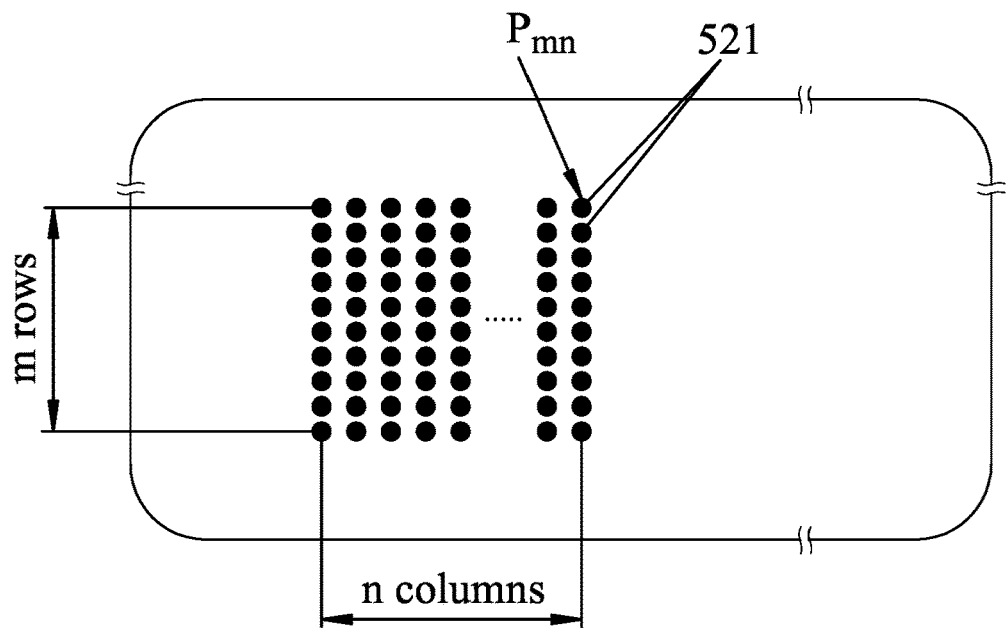
FIG. 2 is a fragmentary schematic top view illustrating a plurality of light-emitting diode (LED) elements of an embodiment of a biometric identification apparatus according to the disclosure.
Figure 3:
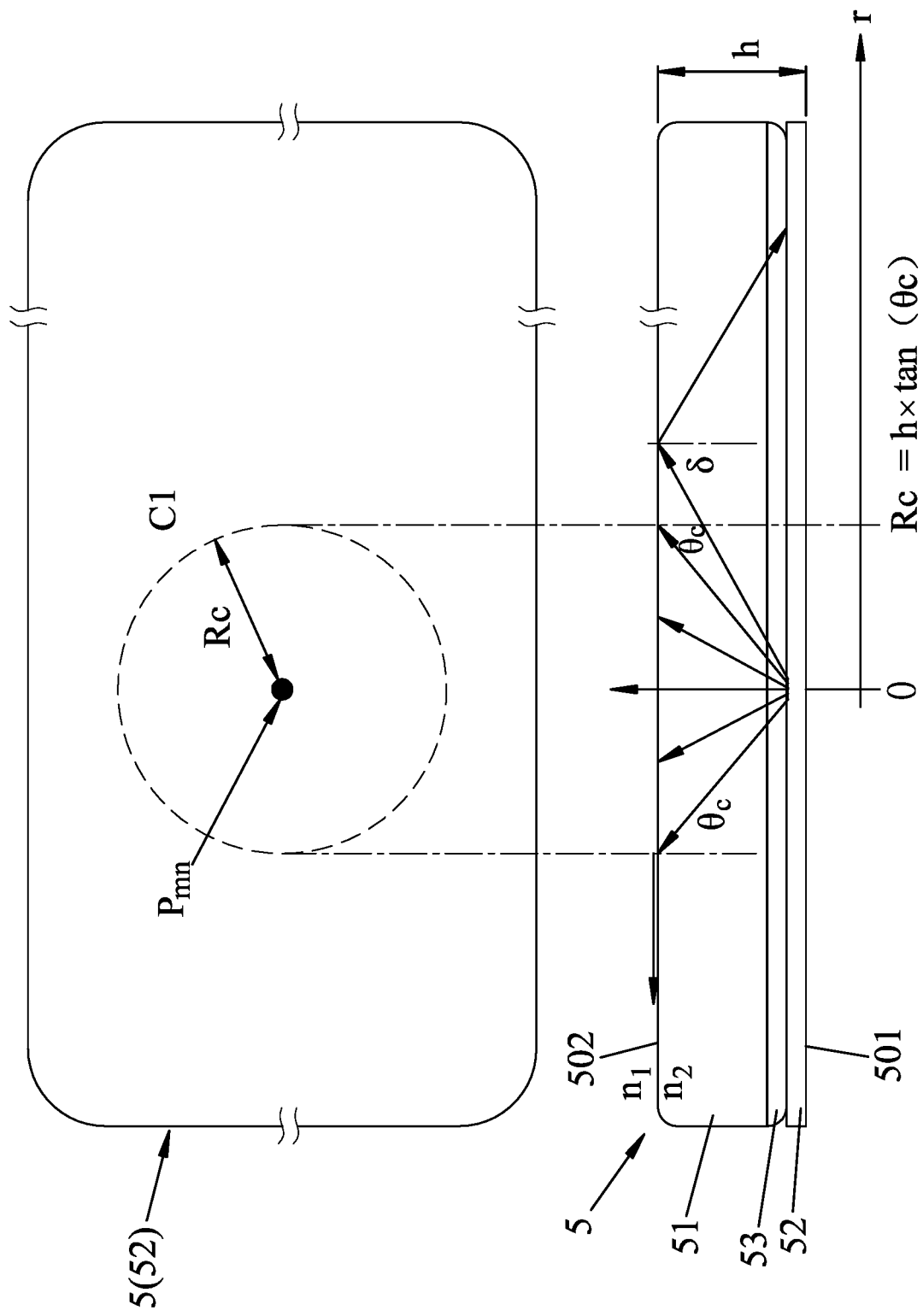
FIG. 3 is a combination of a fragmentary schematic top view and a schematic side view of a cover unit of a biometric identification apparatus according to an embodiment.
Figure 4:
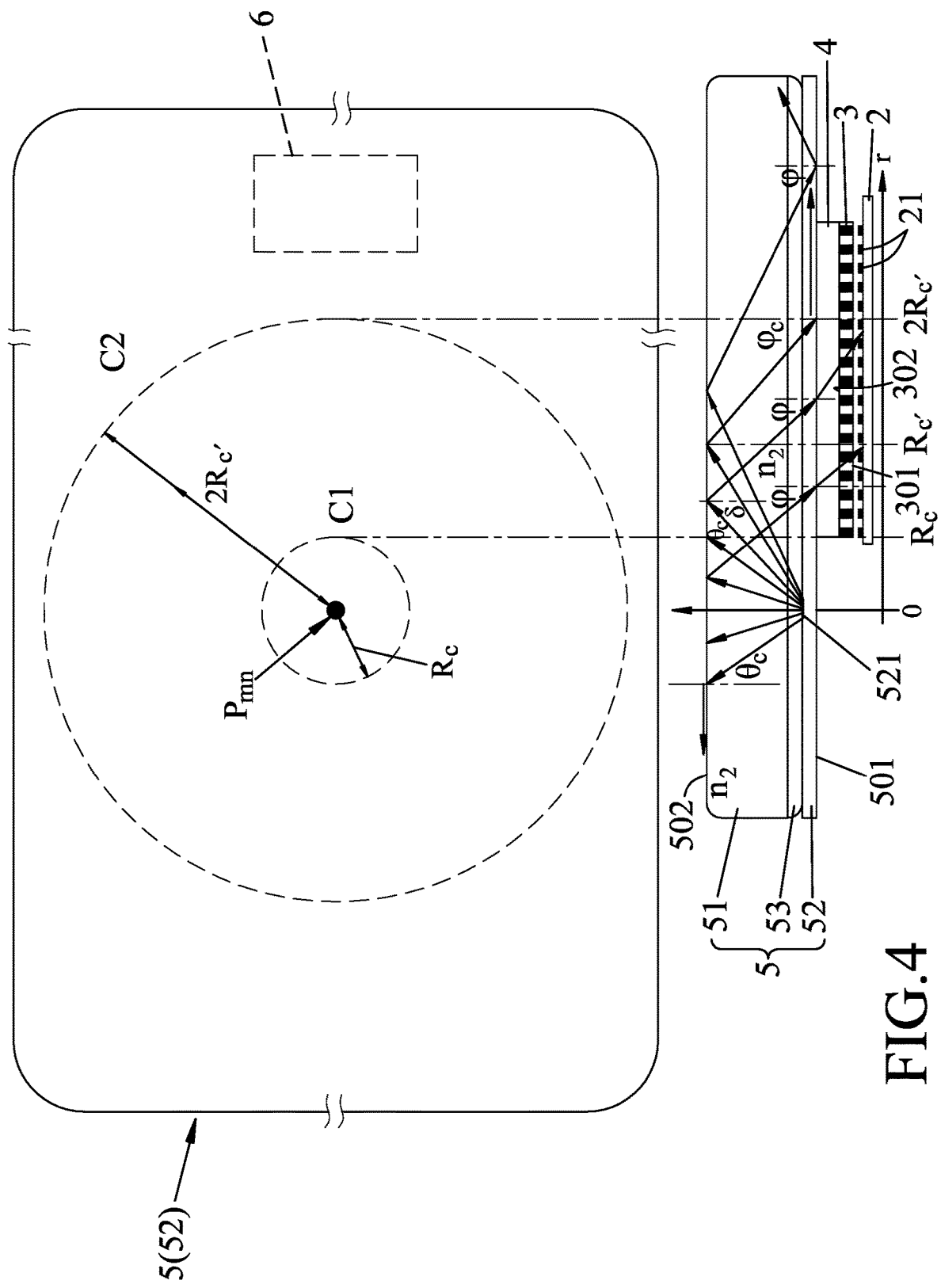
FIG. 4 is a schematic side view of the biometric identification apparatus shown in FIG. 3 and a fragmentary schematic top view of the cover unit of the biometric identification apparatus.

Referring to FIGS. 2 to 4, an embodiment of a biometric identification apparatus according to the disclosure is illustrated. The biometric identification apparatus is useful for detecting and/or identifying a physiological characteristic of an object to be identified. The physiological characteristic may be the object's body surface which is uneven and has multiple concave portions and multiple convex portions, such as fingerprints. In this embodiment, the biometric identification apparatus is exemplified to be used for detecting and identifying human fingerprints. It can be understood that the biometric identification apparatus and method in the present disclosure can also be applied to detect and identify other physiological characteristics.

The embodiment of the biometric identification apparatus according to the disclosure includes a light-transmissible plate, a photodetection member, a light filtering module and a display member. The display member is configured to emit light, and the light is reflected off of a surface of the light-transmissible plate to form an original reflected light. The light filtering module is configured to filter the original reflected light to obtain a light with a traveling direction in a predetermined angle range, and the photodetection member is configured to receive the light filtered by the light filtering module.

In some embodiments, the light filtering module includes a first optical member and a second optical member. The first optical member is configured to filter out a portion of the original reflected light with an incidence angle on a surface of the first optical member greater than a first critical angle, so as to obtain a first reflected light. The first critical angle is a minimum incident angle at which the original reflected light is totally reflected by the surface of the first optical member. The second optical member is configured to filter out a portion of the first reflected light with an incidence angle on a surface of the second optical member smaller than a second critical angle, so as to obtain a second reflected light. The second critical angle is a minimum incident angle at which the light emitted by the display member is totally reflected by the surface of the light-transmissible plate.

Referring to FIG. 4, in some embodiments, the biometric identification apparatus includes the photodetection member, the light filtering module, a cover unit 5, and a processing chip 6. The photodetection member may include a photodetection film 2. The light filtering module may include an optical member 3 serving as the second optical member, and an optical adhesive film 4 serving as the first optical member.

The optical member 3 is disposed on the photodetection film 2 and has an optical-member bottom surface 301 that is proximal to the photodetection film 2 and an optical-member top surface 302 that is opposite to the optical-member bottom surface 301.

The optical adhesive film 4 is disposed on the optical-member top surface 302 of the optical member 3.

The cover unit 5 is disposed on the optical adhesive film 4, and has a cover bottom surface 501 that is attached to the optical adhesive film 4 and a cover top surface 502 that is opposite to the cover bottom surface 501 and that is adapted to be touched with a finger of the object. The cover unit 5 includes a light-transmissible plate 51 that defines the cover top surface 502, and a light-emitting diode (LED) display member 52 that is disposed under the light-transmissible plate 51, that defines the cover bottom surface 501 and that includes a plurality of spaced-apart LED elements 521.

The processing chip 6 is electrically connected to the LED display member 52 of the cover unit 5 and the photodetection film 2 so as to transmit a driving signal to drive the LED display member 52 when the cover top surface 502 of the cover unit 5 is touched with the object's finger and so as to output an identification image data corresponding to the fingerprints of the object's finger.

Each of the LED elements 521 of the LED display member 52 is configured to be driven by the driving signal transmitted from the processing chip 6 to emit an initial light toward the cover top surface 502 of the cover unit 5, and the initial light is partially reflected by the cover top surface 502 to form an optical-adhesive-film incident light incident on the optical adhesive film 4.

The optical adhesive film 4 is configured to filter out a portion of the optical-adhesive-film incident light to form an optical-member incident light entering the optical member 3. The portion of the optical-adhesive-film incident light is incident on the optical adhesive film 4 at a first incident angle greater than an inner critical angle ($\phi c$), which is defined as a minimum incident angle for the optical-adhesive-film incident light incident on the optical adhesive film 4 to generate total reflection at an interface between the cover bottom surface 501 and the optical adhesive film 4.

The optical member 3 is configured to filter out a portion of the optical-member incident light to form a photodetection-film incident light entering the photodetection film 2. The portion of the optical-member incident light is incident on the optical member 3 at a second incident light smaller than an outer critical angle ($\theta c$), which is defined as a minimum incident angle for the initial lights emitted from the LED elements 521 and incident on the cover top surface 502 to generate total reflection at the cover top surface 502. Specifically, the identification image data outputted by the processing chip 6 is converted from the photodetection-film incident light.

In this embodiment, the cover unit 5 further includes a touch screen 53 that is interposed between the light-transmissible plate 51 and the LED display member 52. The touch screen 53 is electrically connected to the processing chip 6 and is configured to generate a touch signal when being touched with the object's finger. The touch signal is received by the processing chip 6 to generate the driving signal.

To be specific, when the object's finger touches the cover top surface 502 of the cover unit 5, the processing chip 6 will transmit the driving signal to the LED elements 521 to drive the LED elements 521. The LED elements 521 are driven to emit the initial lights, which are incident on and pass through the cover top surface 502 of the cover unit and then irradiate on the object's finger. One portion of the initial lights, which irradiate ridges of the fingerprints of the object's finger, will mostly be absorbed by the friction ridges. Another portion of the initial lights, which irradiate grooves of the fingerprints of the object's finger, will be partially reflected back to the biometric identification apparatus due to an air gap between the grooves and the cover top surface 502 of the cover unit 5. Identification image data, which are composed of bright and dark streaks that respectively correspond in position to the grooves and the ridges of the fingerprints of the object's finger, will be reconstructed based on the amount of the photodetection-film incident light received by the photodetection film 2.

The LED display member 52 may be selected from an organic LED (OLED) display member and a micro-LED display member. The LED display member 52 of the cover unit 5 includes the LED elements 521 that are arranged in an m×n array, with m being greater than 1 and n being greater than 1. The processing chip 6 is configured to sequentially drive the LED elements 521 to emit the initial lights toward the cover top surface 502 at a predetermined interval, and to output the identification image data converted from the photodetection-film incident light entering the photodetection film 4 within the interval. In the following, for the sake of illustrating light paths of the initial lights emitted from the LED elements 521, one of the LED elements 521 located at the $m^{th}$ row and $n^{th}$ column in the m×n array is taken as an example and abbreviated to "Pmn". In this embodiment, the LED display member 52 has a thickness less than one tenth of that of the light-transmissible plate 51, and a light-transmissible portion of the LED display member 52 has a refractive index close to that of the light-transmissible plate 51. By direct attachment of the cover bottom surface 501 with the optical adhesive film 4, a change in a light path of the optical-adhesive-film incident light at an interface between the light-transmissible plate 51 and the LED display member 52 can be ignored and is left out for consideration hereinafter.

As shown in FIGS. 3 and 4, the light path of the initial light emitted from the Pmn and an irradiation area formed thereby on the cover top surface 502 are illustrated. The irradiation area shown as a first imaginary circle (C1) has a radius (Rc) and a center (Omn) corresponding to a projection of the Pmn on the cover top surface 502. The irradiation area is formed by a portion of the initial light that is emitted from the Pmn and irradiates on the cover top surface 502 of the cover unit 5 at a top incident angle less than the outer critical angle (θc) when only the cover unit 5 is considered. The circumference of the first imaginary circle (C1) is the radiation area on the cover top surface 502 formed by a portion of the ray of the initial light that is emitted from the Pmn and irradiates on the cover top surface 502 at the top incident angle equal to the outer critical angle (θc).

In this embodiment, the light-transmissible plate is exemplified to be made from glass and has a refractive index (n2) of around 1.5, and the air outside the biometric identification apparatus has a refractive index (n1) of 1, which is less than that of the light-transmissible plate 51. Total reflection will occur at the cover top surface 502 of the light-transmissible plate 51, which is an interface between the cover unit 5 and the air, when a portion of the initial light emitted from the Pmn irradiates on the cover top surface 502 of the cover unit 5 at the top incident angle (δ) greater than the outer critical angle (θc), which satisfies the formula of $\theta c=\sin^{-1}(n1/n2)$.

When the cover top surface 502 of the cover unit 5 is touched with the object's finger, and when the portion of the initial light that is emitted from the Pmn irradiates on the cover top surface 502 at the top incident angle (δ) greater than the outer critical angle (θc), and irradiates on the ridges of the fingerprints of the object's finger, the portion of the initial light will be reflected by the cover top surface 502 of the cover unit 5 and back inside the cover unit 5 to be detected by the photodetection film 2. This is because there is no air gap between the ridges of the fingerprints of the object's finger and the air, thus the condition for generating total reflection is lost. On the other hand, in view of the air gap between the grooves of the fingerprints of the object's finger and the cover top surface 502, when the same portion of the initial light irradiates on the grooves of the fingerprints of the object's finger, the portion of the initial light will maintain total reflection at the top cover surface 502. Consequently, the portion of the initial light that irradiates on the object's finger and is reflected by the cover top surface 502 forms the dark streaks and the bright streaks corresponding to the fingerprints of the object's finger.

Therefore, as compared with the portion of the ray of the initial light irradiating on the top cover surface 502 at the top incident angle (δ) less than the outer critical angle (θc), the portion of the ray of the initial light irradiating on the cover top surface 502 at the top incident angle (δ) greater than the outer critical angle (θc) is more suitable for detecting the grooves of the fingerprints of the object's finger. The above-mentioned radius (Rc) of the first imaginary circle (C1) can serve as a size feature of the irradiation area with relatively high sensitivity on the cover top surface 502 for each of the LED elements 521 of the cover unit 5 of the biometric identification apparatus of the disclosure to detect the fingerprints of the object's finger. Specifically, when the light-transmissible plate 51 has a thickness (h), the radius (Rc) of the first imaginary circle (C1) can be obtained by a formula: Rc=h×tan (θc).

However, when the top incident angle (δ) of the initial light irradiating on the cover top surface 502 of the cover unit 5 is much larger than the outer critical angle (θc), a distance of the light path entering the photodetection film 2 through the cover unit 5 will be disadvantageously long, and thus the photodetection-film incident light will decline and likely become a noise that is impractical for detecting the object's physiological characteristic. Hence, for effective detection of the object's physiological characteristic (i.e., the fingerprints of the object's finger), a range of the incident lights emitted from the LED elements 521 of the cover unit 5 needs to be defined.

Referring back to FIG. 4, in this embodiment, the optical adhesive film 4 is exemplified to have a refractive index (n3) smaller than that (n2) of the light-transmissible plate 51. The total reflection will occur at the interface between the cover bottom surface 501 and the optical adhesive film 4 when the optical-adhesive-film incident light enters the optical adhesive film 4 at the first incident angle (φ) that is greater than the inner critical angle (φc), which satisfies the formula: $\phi c=\sin^{-1}(n3/n2)$. The irradiation area is shown on the cover top surface 502 as a second imaginary circle (C2) that is concentric with the first imaginary circle (C1), in addition to the first imaginary circle (C1) when the entire biometric identification apparatus is considered. The second imaginary circle (C2) has an outer radius (2Rc'), where 2Rc' satisfies the formula of 2Rc'=2×h×tan(φc). The circumference of the second imaginary circle (C2) is the radiation area on the cover top surface 502 formed by a portion of the ray of the initial light that is emitted from the Pmn and forms the optical-adhesive-film incident light entering the optical adhesive film 4 at the first incident angle (φ) equal to the inner critical angle (φc).

Compared with the portion of the ray of the initial light that is emitted from the Pmn and irradiates on the top cover surface 502 at the top incident angle (δ) not less than the outer critical angle (θc), and forms the optical-adhesive-film incident light entering the optical adhesive film 4 at the first incident angle (φ) less than the inner critical angle (φc), the light path of the portion of the ray of the initial light that is emitted from the Pmn and forms the optical-adhesive-film incident light entering the optical adhesive film 4 at the first incident angle (φ) greater than the inner critical angle (φc) will be disadvantageously long and impractical for detecting the object's physiological characteristic. Therefore, the portion of the optical-adhesive-film incident light that enters the optical adhesive film 4 at the first incident angle (φ) greater than the inner critical angle ($\phi c$) is designed to be filtered out by the optical adhesive film 4.

In view of the foregoing, in this embodiment, the preferred portion of the ray of the incident light emitted by the Pmn, which has relatively high accuracy for detecting the object's physiological characteristic, is defined by irradiating on the cover top surface 502 at the top incident angle ($\delta$) greater than the outer critical angle ($\theta c$) and forming the optical-adhesive-film incident light entering the optical adhesive film 4 at the first incident angle ($\phi$) less than the inner critical angle ($\phi c$). The preferred portion of the ray of the incident light emitted by the Pmn forms the ring-shaped irradiation area on the cover top surface 502 between the concentric imaginary circles (C1, C2). In other words, when the first and second imaginary circles (C1, C2) are deemed to be a circle coordinate system with a radius (r) and the origin defined by the projection of the Pmn on the cover top surface 502, the irradiation area of the preferred portion of the ray of the incident light emitted by the Pmn on the cover top surface 502 is defined by a circular area with the radius (r) satisfying a range: Rc<r<2Rc'.

As shown in FIG. 4, the portion of the ray of the initial light irradiating on the cover top surface 502 at the top incident angle ($\delta$) smaller than the outer critical angle ($\theta c$) is filtered out by the optical member 3 that is disposed above the photodetection film 2 so as to prevent the same from entering the photodetection film 2. In this embodiment, the optical member 3 is selected from a shielding-type optical element and a phase variation optical element. The shielding-type optical element is selected from a periodical pinhole array and a non-periodical pinhole array. The phase variation optical element has a structure selected from a photonic crystal structure with a refractive index varied periodically, a microlens array structure with a refractive index varied periodically, an incident light-scattered crystal structure with a refractive index varied non-periodically, and an incident light-scattered crystal structure with a refractive index varied non-periodically, and an incident light-diffused crystal structure with a refractive index varied non-periodically.

More specifically, the shielding-type optical element includes a plurality of pinholes. The pinholes may be circle or rectangular in shape. The optical member 3 selected from the shielding-type optical element may be designed based on the compressive sampling theory of coded aperture. When the photodetection display apparatus of the disclosure is used for identifying the user's fingerprint, the photodetection-film incident light detected and received by the photodetection film 2 is only required to have two brightness levels, which are dark patterns and bright patterns. By way of filtering the spatial frequency (in this embodiment, the portion of the rays of the incident lights emitted by the LED elements 521 having the incident angle ($\delta$) smaller than the outer critical angle ($\theta c$) and greater than the inner critical angle ($\phi c$) is required to be filtered out), the optical member 3 designed upon the coded aperture has a light guiding function. Hence, the optical member 3 is able to filter out the portion of the rays of the incident lights of the LED elements 521 which form the irradiation area on the cover top surface 502 inside the first imaginary circle (C1) or outside the second imaginary circle (C2), and forms the photodetection-film incident light that can subsequently form dark and bright patterns with high resolution in correspondence with the object's physiological characteristic. Moreover, the photodetection-film incident light is able to enter the photodetection film 2 in a direction close to a normal line that is perpendicular to the photodetection film 2. The compressive sampling theory of coded aperture is based on an article: "Coded apertures: past, present, and future application and design," Stephen R. Gottesman, Proceeding of SPIE, vol. 6714, (2007). For the sake of brevity, further details thereof are not provided herein.

In certain embodiments, the optical member 3 may be designed and obtained according to digital holography. With the digital holography, the optical member 3 may be designed according to predetermined requirements as mentioned above. The digital holography is based on an article: "Synthesis of digital holograms by direct binary search," M. A. Seldowitz, J. P. Allebach, and D. W. Sweeney, Appl. Opt. 26, 2788-2798 (1987).

Figure 5:
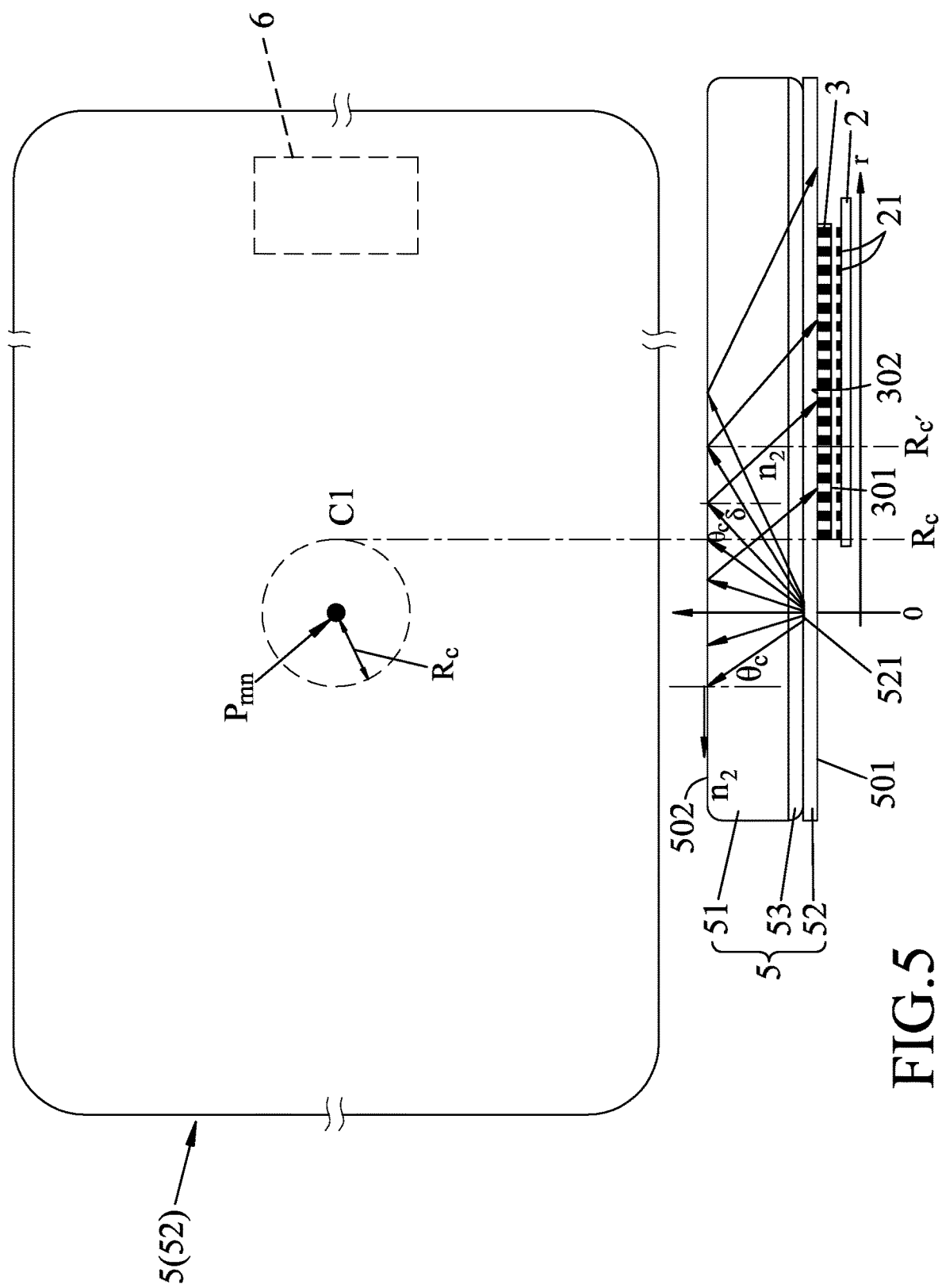
FIG. 5 is a schematic side view of a biometric identification apparatus according to another embodiment and a fragmentary schematic top view of a cover unit of the biometric identification apparatus.

Referring to FIG. 5, in another embodiment, the light filtering module is modified to omit the first optical member and only includes the second optical member. The second optical member is configured to filter out a portion of the original reflected light with an incidence angle on a surface of the optical member smaller than a second critical angle ($\theta c$) so as to obtain a second reflected light. The second reflected light is received by the photodetection member, and the second critical angle ($\theta c$) is a minimum incident angle at which the light emitted by the display member is totally reflected by the surface of the light-transmissible plate. In some embodiments, the surface of the light-transmissible plate is configured to be touched by an object that is to be identified. The difference between this embodiment and the embodiment shown in FIG. 4 is that the light filtering module only includes the optical member 3 and does not include the optical adhesive film 4. That is, the original reflected light in the embodiment of FIG. 5 is filtered only once by the optical member 3 before entering the photodetection film 2, while the original reflected light is sequentially filtered twice by the optical member 3 and the optical adhesive film 4 before entering the photodetection film 2 in the embodiment of FIG. 4. Thus, the first imaginary circle (C1) defines a boundary of the light filtered by the optical member 3, which is also a boundary of the second reflected light to be received by the photodetection member. In this way, the original reflected light is filtered to obtain the second reflected light with a traveling direction in the predetermined angle range that refers to the portion of the original reflected light with an incidence angle on the surface of the optical member 3 greater than the second critical angle ($\theta c$). In some embodiments, the cover unit 5, the optical member 3 and the photodetection film 2 are sequentially stacked along a thickness direction of the biometric identification apparatus, and there is no air gap between any two adjacent layers.

Figure 6:
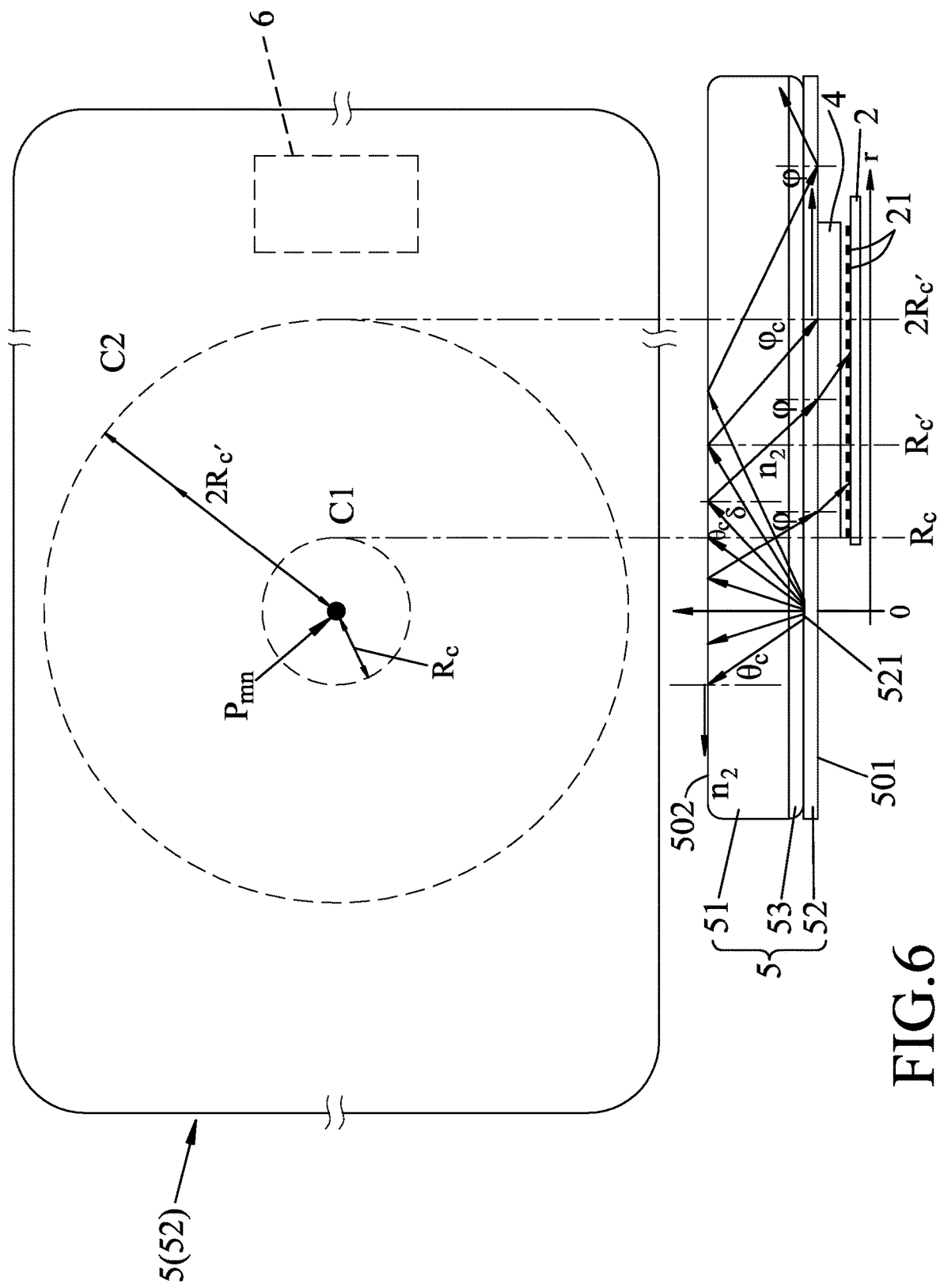
FIG. 6 is a schematic side view of a biometric identification apparatus according to another embodiment and a fragmentary schematic top view of a cover unit of the biometric identification apparatus.

In another embodiment, the light filtering module includes the first optical member. The first optical member is configured to filter out a portion of the original reflected light with an incidence angle on a surface of the first optical member greater than a first critical angle ($\phi c$), so as to obtain a first reflected light. The first reflected light is received by the photodetection member, and the first critical angle ($\phi c$) is a minimum incident angle at which the original reflected light is totally reflected by the surface of the first optical member. The surface of the first optical member may be an interface between the first optical member and the display member. As shown in FIG. 6, such embodiment of the biometric identification apparatus is similar to the embodiment shown in FIG. 4, and the difference between this embodiment and the embodiment shown in FIG. 4 resides in that the light filtering module only includes the optical adhesive film 4 and does not include the optical member 3. That is, the original reflected light in the embodiment of FIG. 6 is filtered only once by the optical adhesive film 4 before entering the photodetection film 2, while the original reflected light is sequentially filtered twice by the optical adhesive film 4 and the optical member 3 before entering the photodetection film 2 in the embodiment of FIG. 4. Thus, the second imaginary circle (C2) defines a boundary of the light filtered by the optical adhesive film 4, which is also a boundary of the first reflected light to be received by the photodetection member. In this way, the original reflected light is filtered to obtain the first reflected light with a traveling direction in the predetermined angle range that refers to the portion of the original reflected light with an incidence angle on the surface of the optical adhesive film 4 smaller than the first critical angle ($\phi c$). In some embodiments, the cover unit 5, the optical adhesive film 4 and the photodetection film are sequentially stacked along a thickness direction of the biometric identification apparatus, and there is no air gap between any two adjacent layers.

Figure 7:
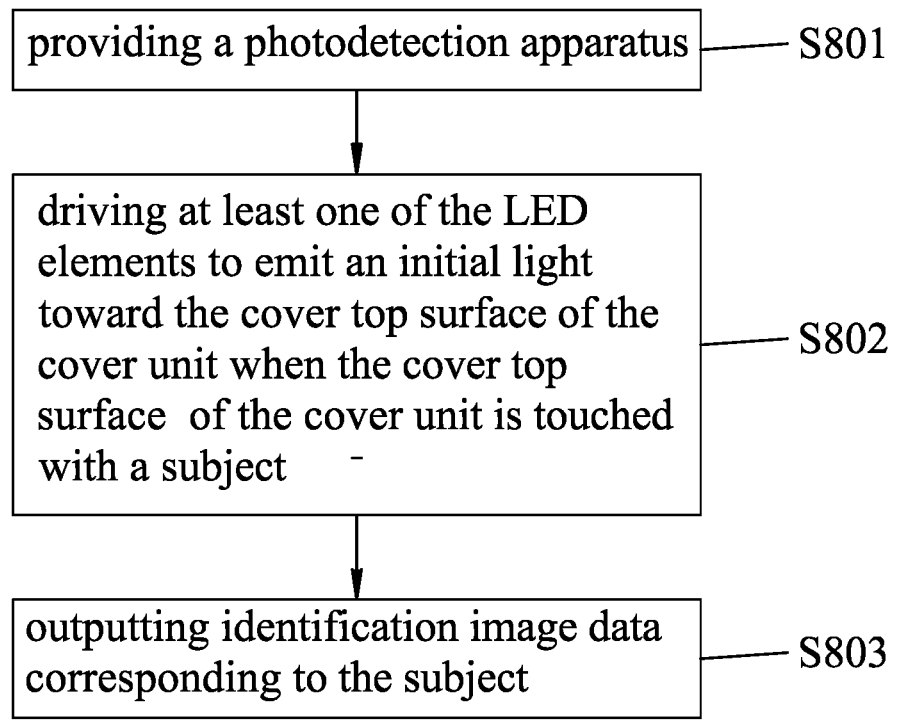
FIG. 7 is a flow chart illustrating an embodiment of a biometric identification method according to the disclosure.

Referring to FIG. 7, an embodiment of a biometric identification method according to the disclosure is illustrated. The identification method includes Steps S801 to S803.

In Step S801, the abovementioned biometric identification apparatus is provided.

In Step S802, the at least one of the LED elements 521 of the LED display member 52 is driven to emit an initial light toward the cover top surface 502 of the cover unit 5 when the cover top surface 502 of the cover unit 5 is touched with the object to be identified.

In Step S803, identification data corresponding to the object to be identified is outputted.

To be specific, the biometric identification method of the disclosure further includes: interposing the touch screen 53 between the light-transmissible plate 51 and the LED display member 52, generating the touch signal when the touch screen 53 is touched with the object to be identified, and generating the driving signal by the processing chip 6 upon receipt of the touch signal.

In this embodiment, when the user's finger touches on the cover top surface 502 of the cover unit 5, the touch signal is first generated by the touch screen 53 upon touching of the finger, and then the driving signal is generated by the processing chip 6 upon receipt of the touch signal. Thereafter, the at least one of the LED elements 521 of the LED display member 52 is driven upon receipt of the driving signal to emit the ray of the initial light toward the cover top surface 502 of the cover unit 5 to irradiate the user's fingerprint through the cover unit 5.

Since the cover unit 5 has a predetermined transmittance, the initial light emitted from the at least one LED element 521 toward the cover top surface 502 is not only reflected by the cover top surface 502 to form the optical-adhesive-film incident light, but also travels in the air through the cover unit 5. In this embodiment, the portion of the ray of the initial light reflected off of the cover top surface 502, which is able to enter the photodetection film 2 after being filtered by the optical adhesive film 4 and the optical member 3 as mentioned above and finally received by the photodetection film 2, serves as the basis for generating the image signal by the processing chip 6.

More specifically, the LED display member 52 may include m×n of the LED elements 521 that are arranged in the array, with m being greater than 1 and n being greater than 1. The LED elements 521 may be respectively driven with a plurality of the driven signals generated by and transmitted from the processing chip 6 at a predetermined interval, such that a plurality of the photodetection-film incident lights generated have an incident angle entering the photodetection film 2 greater than outer critical angle ($\theta c$) and smaller than the inner critical angle ($\phi c$). In other words, each of the photodetection-film incident lights is formed from the portion of the rays of the incident lights that form the irradiation area on the cover top surface 502 in the form of the circular area with the radius (r) satisfying the inequality: $Rc<r<2Rc'$. Moreover, complete identification image data are generated by superimposing the photodetection-film incident lights received by the photodetection film 2.

In this embodiment, the LED elements 521 are sequentially and respectively driven with the driven signals generated by and transmitted from the processing chip 6 at the predetermined interval, such that the initial lights emitted from the LED elements 521 and reflected off of the cover top surface 502 of the cover unit 5 are in a form of light points. Moreover, the outputting operation of the processing chip 6 is conducted by superimposing the photodetection-film incident lights in a form of the light points received by the photodetection film 2 so as to generate the complete identification image data.

In one form, the LED display member 52 may include the LED elements 521 that are arranged in the m×n array, with m being greater than 1 and n being greater than 1. The LED elements 521 are grouped into a plurality of groups. The driving of the LED elements 521 is conducted by driving the groups of the LED elements 521 sequentially and respectively with a plurality of the driving signals generated by and transmitted from the processing chip 6 at the predetermined internal, such that the initial lights emitted from the groups of the LED elements 521 and reflected off of the cover top surface 502 of the cover unit 5 are in a form of the light points. The outputting operation of the processing chip 6 is conducted by superimposing the groups of the light points received by the photodetection film 2 so as to generate the complete identification image data.

For instance, when the LED display member 52 includes the LED elements 521 arranged in the m rows and the n columns, where both m and n are greater than 1, the LED elements 521 of each of the m rows are grouped so as to form m groups, and each of the groups including the LED elements 521 in the number of n. The LED elements 521 included in the first group are designated as $P_{11}, P_{12}, \ldots,$ and $P_{1n}$; the LED elements 521 included in the second group may be designated as $P_{21}, P_{22}, \ldots,$ and $P_{2n}$, and so on. Thus, the LED elements 521 included in the $m^{th}$ group are designated as $P_{m1}, P_{m2}, \ldots,$ and $P_{mn}$. Hence, the LED elements 521 may be grouped periodically and then the grouped LED elements 521 can be driven periodically. Alternatively, the LED elements 521 may be grouped non-periodically. Whether or not the LED elements 521 are grouped, or how to group the LED elements 521 may be determined based on practical requirements.

The photodetection film 2 includes a plurality of the photodetection regions 21 that are arranged in a p×q array, with p being greater than 1 and q being greater than 1. Each of the photodetection regions 21 includes a thin film transistor portion 211 and a photodetection sensor 212 that is selected from a photodiode and a photodetection transistor.

Figure 8:
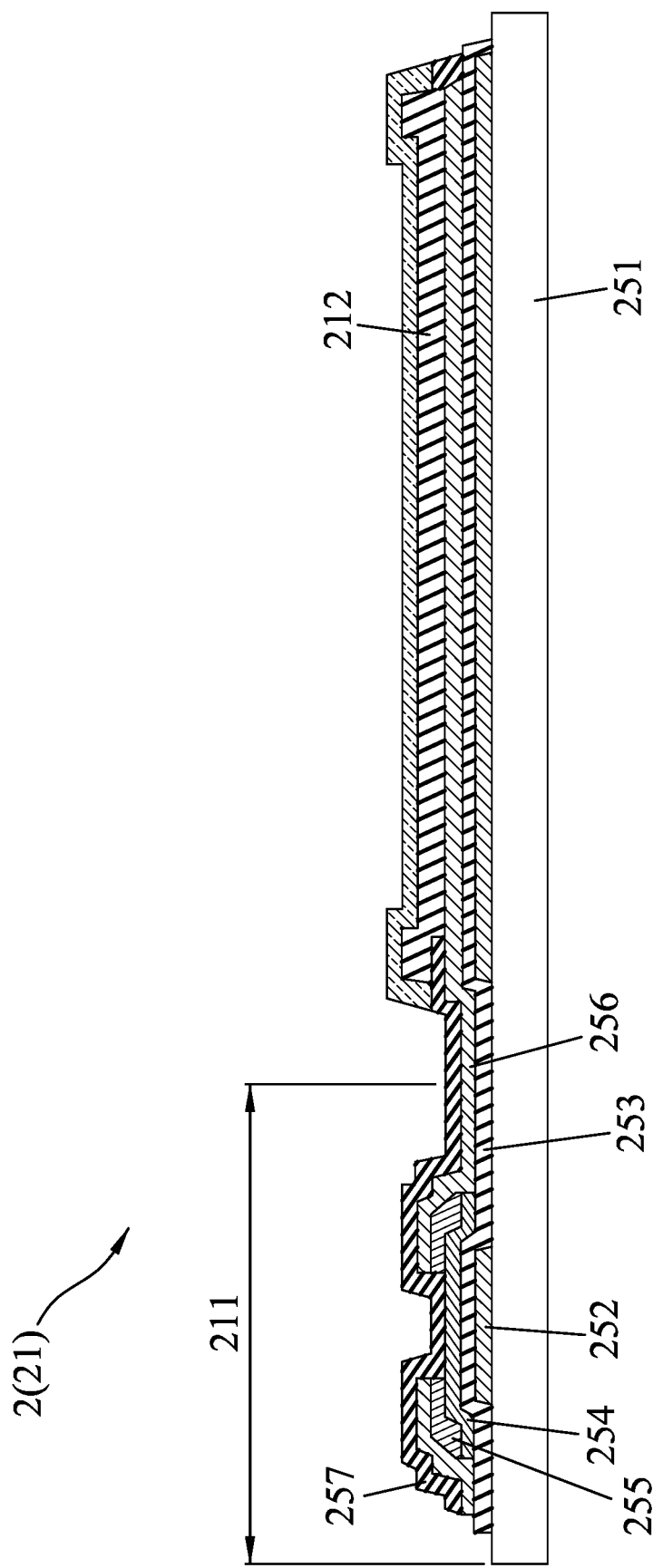
FIG. 8 is a schematic cross-sectional view illustrating a photodetection sensor applicable to photodetection regions of the photodetection film of the embodiment of the biometric identification apparatus.

Referring to FIG. 8, one of the photodetection regions 21 of the photodetection film 2 is illustrated. The photodetection sensor 212 is exemplified to be a photodiode. The thin film transistor portion 211 is formed on a substrate 251, which may be a glass sheet or a plastic sheet as mentioned above. The thin film transistor portion 211 includes a gate electrode layer 252 formed on the substrate 251, a first isolating layer 253 formed on the gate electrode layer 252, an intrinsic amorphous silicon channel layer 254 formed on the first isolating layer 253, an n+-doped amorphous silicon (n-a-Si) source-and-drain contact terminal 255 formed on the intrinsic amorphous silicon channel layer 254, a source-and-drain metal electrode 256 formed on the n+-doped amorphous silicon (n-a-Si) source-and-drain contact terminal 255, and a second isolating layer 257 formed on the source-and-drain metal electrode 256. The abovementioned components 251 to 257 are not of essence to the present disclosure, and therefore will not be further elaborated.

The photodiode of the photodetection region 21 may include an n-type semiconductor layer, an intrinsic semiconductor layer disposed on the n-type semiconductor layer, and a p-type semiconductor layer disposed on the intrinsic semiconductor layer. The intrinsic semiconductor layer has a structure selected from a microcrystalline silicon structure, and a non-crystalline silicon-germanium structure. The microcrystalline silicon structure has a crystallinity greater than 40% and a band gap less than 1.7 eV, and may be formed by mixing a silane and hydrogen gas using chemical vapor deposition (CVD). The non-crystalline silicon-germanium has a band gap less than 1.7 eV and may be formed by mixing a germane ($GeH_4$), hydrogen gas and a silane using the CVD.

The band gap is an important physical parameter of the semiconductor material and is determined by the band structure of the semiconductor material, which is relevant to the crystal structure and binding properties of atoms, etc.

At room temperature (300 K), the band gap of the germanium is 0.66 eV, and the band gap of the intrinsic semiconductor layer of the above photodiode is decreased when germanium is doped in saline. When the band gap of the intrinsic semiconductor layers of the photodiodes is less than 1.7 eV, the intrinsic semiconductor layers of the photodiodes can absorb the light having the wavelength ranging from the visible light region to the infrared light region (or near infrared light region). In this embodiment, by controlling the concentration of $GeH_4$, the photodiode of each of the photodetection regions 21 having one of the non-crystalline silicon-germanium structure and the microcrystalline silicon-germanium structure can absorb the light having an expanded wavelength ranging from 600 nm to 2000 nm.

Alternatively, the photodetection sensor 212 of each of the photodetection regions 21 of the photodetection film 2 may include two of the photodiodes that are stacked upon each other (not shown). To be specific, an upper one of the photodiodes is disposed on a lower one of the photodiodes. The upper one of the photodiodes includes a p/i/n structure which includes the n-type semiconductor layer that is disposed on the lower one of the photodiodes, the intrinsic semiconductor layer that may have the amorphous silicon structure and that is disposed on the n-type semiconductor layer, and the p-type semiconductor layer that is disposed on the intrinsic semiconductor layer. The lower one of the photodiodes includes the p/i/n structure which includes the n-type semiconductor layer, the intrinsic semiconductor layer that may have the microcrystalline structure, a polycrystalline structure or a compound doped with a material which can detect an expanded wavelength of the light and that is disposed on the n-type semiconductor layer, and the p-type semiconductor layer that is disposed on the intrinsic semiconductor layer. The photodetection sensor of each of the photodetection regions 21 may have a structure of more than two of the photodiodes that are stacked upon one another.

In one form, the p-type semiconductor layer of the photodiode serving as the photodetection sensor of each of the photodetection regions 21 of the photodetection film 2 includes a plurality of p-type semiconductor layered portions that are sequentially stacked on the intrinsic semiconductor layer.

Specifically, the p-type semiconductor layer may include three of the p-type semiconductor layered portions. The topmost one of the p-type semiconductor layered portions has a non-crystalline silicon structure and is heavily doped with the p-type dopant of borane (having a concentration of the p-type dopant of borane more than twice of the normal level), and the other ones of the p-type semiconductor layered portions have the microcrystalline structure, and are normally doped with the p-type dopant of borane (having a concentration of the p-type dopant of borane within the normal level). By way of decreasing thicknesses of the other ones of the p-type semiconductor layered portions relative to the topmost one of the p-type semiconductor layered portions, the light absorbed by the p-type semiconductor layered portions is decreased. Thus, the light entering into and absorbed by the intrinsic semiconductor layer is increased so as to improve the photoelectric conversion efficiency of the photodetection film 2. In addition, since each of the other ones of the p-type semiconductor layered portions has the concentration of the p-type dopant of borane within the normal level, damage of the built-in voltage of the photodiode resulting from the topmost one of the p-type semiconductor layered portions can be prevented. The p-type semiconductor layer may include more than three of the p-type semiconductor layered portions, and similar to the abovementioned configuration, the topmost one of the p-type semiconductor layered portions is heavily doped with the p-type dopant of borane while the other ones of the p-type semiconductor layered portions have the concentration of the p-type dopant of borane within the normal level.

Similarly, the n-type semiconductor layer of the photodiode of each of the photodetection regions 21 of the photodetection film 2 may include a plurality of n-type semiconductor layered portions. The n-type semiconductor layer may include three of the n-type semiconductor layered portions that are stacked upon one another. A bottommost one of the n-type semiconductor layered portions, which is most distal to the intrinsic semiconductor layer, has a non-crystalline silicon structure and is heavily doped with the n-type dopant of phosphorus (having a concentration of the n-type dopant of phosphorus more than twice of the normal level), and the other ones of the n-type semiconductor layered portions sequentially disposed on the bottommost n-type semiconductor layered portion have the microcrystalline structure, and are normally doped with the n-type dopant of phosphorus (having a concentration of the n-type dopant of phosphorus within the normal level). By way of decreasing thicknesses of the other ones of the n-type semiconductor layered portions relative to the bottommost one of the n-type semiconductor layered portion, the light absorbed by the n-type semiconductor layer is decreased. Thus, the light reflected by n-type semiconductor layer and entering into and absorbed again by the intrinsic semiconductor layer is increased so as to improve the photoelectric conversion efficiency of the photodetection film 2. In addition, since two of the n-type semiconductor layered portions have the concentration of the n-type dopant of phosphorus within the normal level, damage of the built-in voltage of the photodiode resulting from the bottommost one of the n-type semiconductor layered portions can be prevented. The n-type semiconductor layer may include more than three of the n-type semiconductor layered portions, and similar to the abovementioned configuration, the bottommost one of the n-type semiconductor layered portions is heavily doped with the n-type dopant of borane, while the other ones of the n-type semiconductor layered portions have the concentration of the p-type dopant of borane within the normal level.

Figure 9:
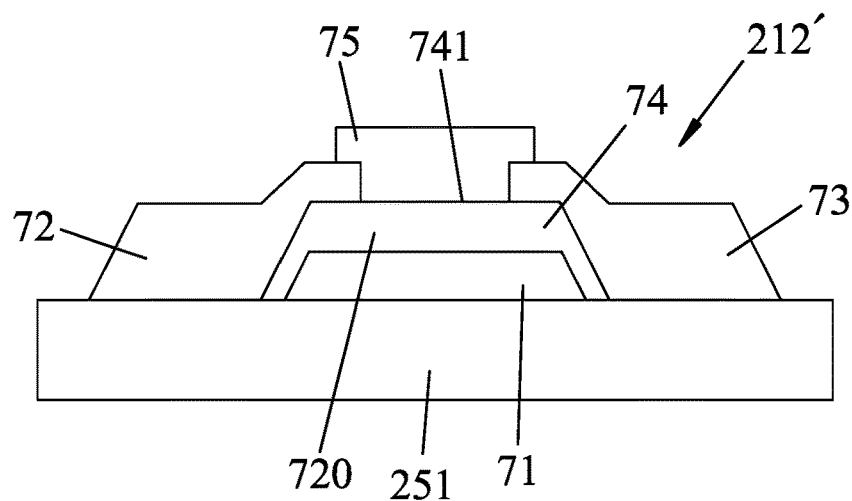
FIG. 9 is a schematic view illustrating another configuration of the photodetection sensor applicable to the photodetection regions of the photodetection film of the embodiment of the biometric identification apparatus.

Further referring to FIG. 9, another configuration of the photodetection sensor of the one of the photodetection regions 21 is illustrated. In this embodiment, the photodetection sensor is exemplified to be a photodetection thin film transistor 212'. The photodetection thin film transistor 212' includes a gate electrode 71, a gate insulating layer 74, at least one drain terminal 72, at least one source terminal 73, and a light-absorbing semiconductor layer 75. The gate insulating layer 74 is surroundingly formed on the gate electrode 71. The at least one drain terminal 72 is disposed on the gate insulating layer 74 and is spaced apart from the gate electrode 71. The at least one source terminal 73 is disposed on the gate insulating layer 74 and is spaced apart from the gate electrode 71 and the at least one drain terminal 72. The light-absorbing semiconductor layer 75 is disposed on an exposed portion 741 of the gate insulating layer 74, which is exposed from the at least one drain terminal 72 and the at least one source terminal 73, and extends between the at least one drain terminal 72 and the at least one source terminal 73, so as to serve as a leakage current channel 720 extending between the at least one drain terminal 72 and the at least one source terminal 73. The photodetection thin film transistor 212' is an inverted-coplanar structure relative to the substrate 251 with the gate electrode 71 being proximal to the substrate 251, and the light-absorbing semiconductor layer 75 being distal from the substrate 251. Bottom surfaces of the at least one source terminal 73 and the at least one drain terminal 72 that are proximal to the substrate 251 are coplanar.

When the gate electrode 71 of the photodetection thin film transistor 212' is turned off without light illuminating the photodetection thin film transistor 212', electric current will not be generated in the leakage current channel 720 between the at least one source terminal 73 and the at least one drain terminal 72 of the photodetection thin film transistor 212' by means of an electric potential difference between the at least one drain terminal 72 and the at least one source terminal 73. However, when the gate electrode 71 of the photodetection thin film transistor 212' is turned off and the light having a photon energy higher than that of a band gap of the light-absorbing semiconductor layer 75 illuminates the photodetection thin film transistor 212' in a direction extending from the light-absorbing semiconductor layer 75 toward the gate electrode 71, a leakage current will be generated in the leakage current channel 720 by means of the electric potential difference between the at least one drain terminal 72 and the at least one source terminal 73. In detail, by way of the light illumination, electrons of light-absorbing semiconductor layer 75 in a ground state are excited to generate electron-hole pairs, and separation of the electron-hole pairs will be driven by the electric field between the at least one source terminal 73 and the at least one drain terminal 72 of the photodetection thin film transistor 212' so as to generate the leakage current. Since the light-absorbing semiconductor layer 75 is disposed to be a topmost and farthest layer of the photodetection thin film transistor 212' relative to the substrate 251, the light can illuminate the light-absorbing semiconductor layer 5 without passing through the gate electrode 71 and the gate insulating layer 74, and thus, excitation of electrons of the light-absorbing semiconductor layer 75 can be enhanced, and photovoltaic conversion efficiency of the photodetection thin film transistor 212' can be improved.

Figure 11:
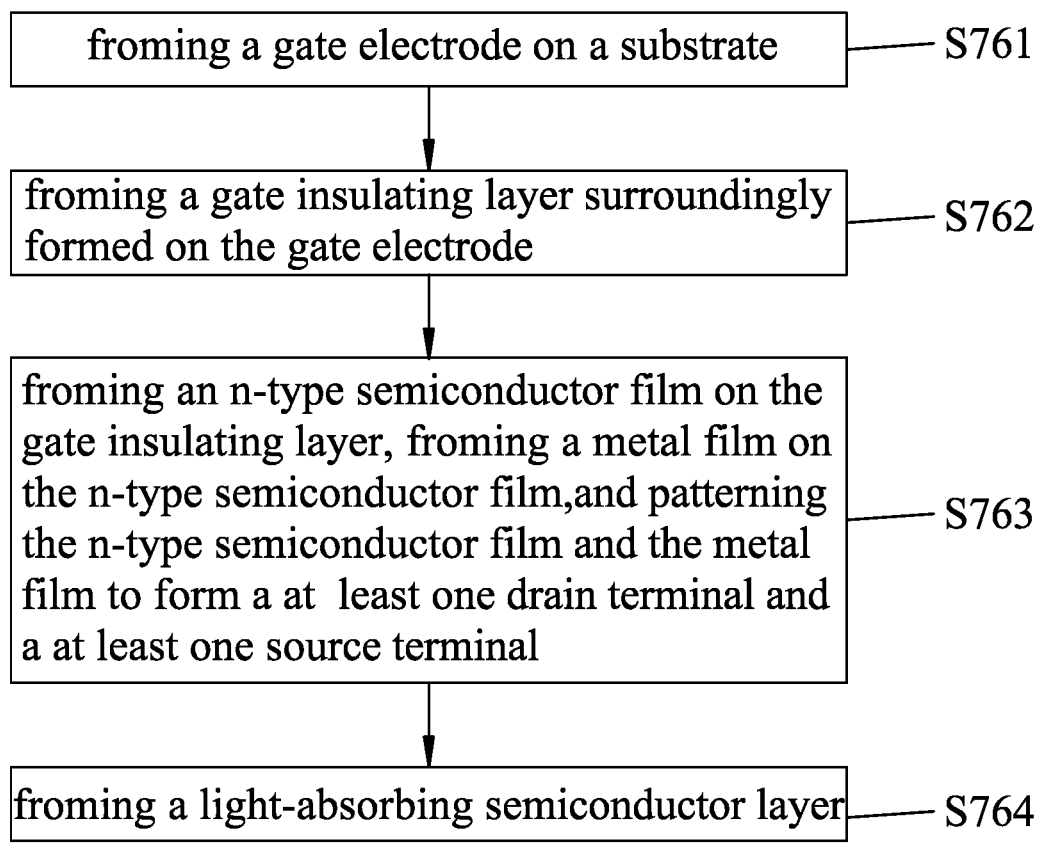
FIG. 11 is a flow chart illustrating a method of making the photodetection sensor of FIG. 9.

Further referring to FIG. 11, a method of making the thin film transistor 212' of is illustrated and includes Steps S761 to S764.

In Step S761, the gate electrode 1 is formed on the substrate 251 using magnetron sputtering techniques. As mentioned above, the substrate 251 may be made of an inflexible material, such as glass, or a flexible material, such as the heat-resistant plastic, for example, polyimide.

In Step S762, a gate insulating layer 74 is surroundingly formed on the gate electrode 71 using the CVD techniques or the magnetron sputtering techniques.

In Step S763, an n-type semiconductor film is formed on the gate insulating layer 74 using the CVD techniques, a metal film is formed on the n-type semiconductor film using the magnetron sputtering techniques, and the n-type semiconductor film and the metal film are patterned to form the at least one drain terminal 72 and the at least one source terminal 73, which are spaced apart from each other, using photolithography and etching techniques. By way of Step S763, an exposed portion 741 of the gate insulating layer 74, which is exposed from the at least one drain terminal 72 and the at least one source terminal 73, is formed.

In Step S764, the light-absorbing semiconductor layer 75 that extends between the at least one drain terminal 72 and the at least one source terminal 73 is formed on the exposed portion 741 of the gate insulating layer 74 using the CVD techniques.

For a conventional thin-film transistor, a structure for collecting the photoelectric current in the semiconductor layer is not required and thus is not considered. In contrast, for the photodetection thin film transistor 212' of the disclosure, a structure for collecting the photoelectric current, i.e., the light-induced leakage current, is required. In detail, if a drift path of photoelectrons, which are generated by separation of the electron-hole pairs induced in the light-absorbing semiconductor layer 75 and are driven by the electric field between the at least one source terminal 73 and the at least one drain terminal 72 is too long, the excited electrons might have recombine with the holes or might be captured by dangling bonds present in the light-absorbing semiconductor layer 75 before reaching at the at least one source terminal 73 or the at least one drain terminal 72. Therefore, generation and output of the leakage current of the photodetection thin film transistor 212' may be deteriorated.

Figure 10:
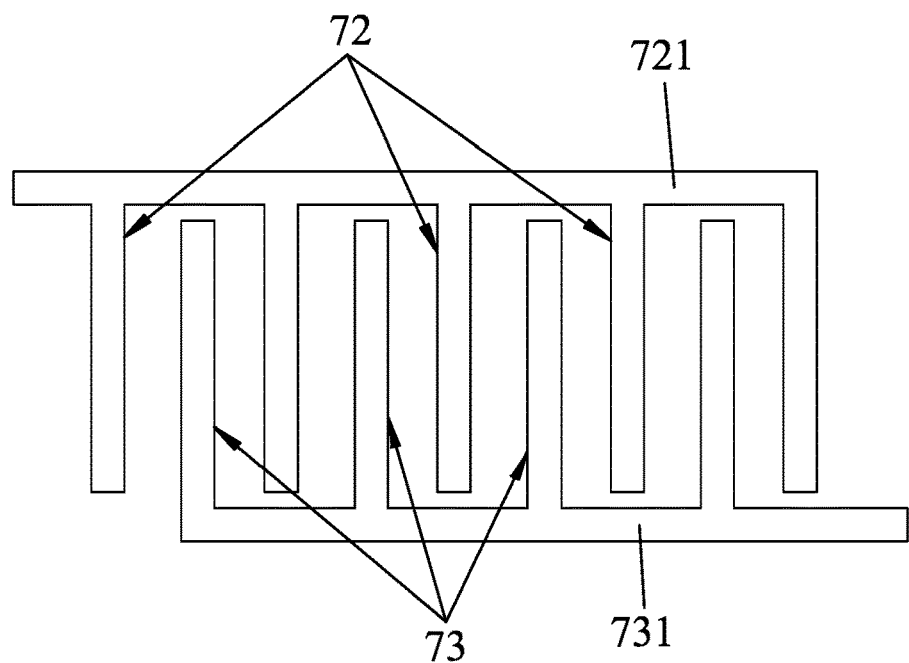
FIG. 10 is a schematic view illustrating a modification of the photodetection sensor of FIG. 9.

Referring to FIGS. 9 and 10, in order to improve output of the leakage current, a modification of the photodetection sensor shown in FIG. 9 is proposed. The photodetection thin film transistor 212' includes a plurality of the drain terminals 72 that are spaced apart from each other and that are electrically connected in parallel, and a plurality of the source terminals 73 that are spaced apart from each other and that are electrically connected in parallel. The drain terminals 72 and the source terminals 73 are separately and alternately arranged on the gate insulating layer 74. The light-absorbing semiconductor layer 75 disposed on the exposed portion 741 of the gate insulating layer 74 is exposed among the drain terminals 72 and the source terminals 73 and extends among the drain terminals 72 and the source terminals 73. More specifically, each of the drain terminals 72 and the source terminals 73 is directly formed on the gate insulating layer 74. The photodetection thin film transistor 212' may further include a drain connecting portion 721 and a source connecting portion 731. Each of the drain terminals 72 is connected to the drain connecting portion 721 such that the drain terminals 72 are electrically connected in parallel. Each of the source terminals 73 is connected to the source connecting portion 731 such that the source terminals 73 are electrically connected in parallel. A distance between one of the source terminals 73 and an adjacent one of the drain terminals 72 is smaller than the drift path of the photoelectrons, which is an average moving distance of the photoelectrons, before the photoelectrons recombine with the holes in the light-absorbing semiconductor layer 75. Therefore, undesired recombination of electron-hole pairs can be alleviated so as to enhance the leakage current generated in the leakage current channel 720 and the photosensitivity of the photodetection thin film transistor 212'.

A method of making the photodetection thin film transistor 212' of the photodetection sensor of FIG. 10 may be similar to that of FIG. 11 except that in Step S763, the patterning of the n-type semiconductor film (not shown) and the metal film (not shown) includes forming the drain terminals 72 that are spaced apart from each other and that are electrically connected in parallel, and the source terminals 73 that are spaced apart from each other and that are electrically connected in parallel, such that the drain terminals 72 and the source terminals 73 are spaced apart from one another and are alternately arranged on the gate insulating layer 74.

Referring back to FIG. 8, when the photodetection film 2 is operated in the photodetection state, the photodetection sensors (not shown) are able to detect the light reflected off of a detecting portion of the user, such as a fingerprint, an eyeball, or an iris of the user. When the photodetection film 2 is operated in the light-emitting state, the light (e.g. infrared light) emitted by the photodetection sensors serves as a light source. To be specific, the photodetection sensors may be switched to be operated in the photodetection state and the light-emitting state alternately, in a predetermined frequency (also in a predetermined period). In practical use, when each of the photodetection sensors is the photodiode, an external bias (a forward bias, a zero bias or a reverse bias) through a respective one of the thin film transistor portion 211 will be applied to the photodiode of the pixel thin film circuit to drive the photodiode, so as to perform the infrared-emitting and the photodetection function of the photodetection film 2.

To be specific, the external bias, i.e., the forward bias, the zero bias or the reverse bias may be alternately applied to the photodiode to drive the photodiode to perform light emission or light detection. In a first period, when the photodiodes arranged in 10 rows are infrared detection diodes and the forward bias is applied to the photodiodes, the photodiodes will emit infrared light. Subsequently, in a second period, when the zero bias or the reverse bias is applied to the photodiodes, the photodetection film 2 will detect the infrared light that is reflected by the detecting portion of the user (e.g. the user's eyeball) so that the reflected infrared light is converted into the optoelectronic signals to subsequently form the image signal. Next, in a third period, the forward bias is again applied to the photodiodes, and the photodiodes will emit infrared light again. The predetermined frequency may be adjusted based on practical use. In certain embodiments, each of the periods may be determined based on the time required for formation of the image signal.

In certain embodiments, the biometric identification apparatus includes a plurality of the photodetection films 2. The LED display member defines a plurality of the display photodetection regions. Each of the photodetection films 2 is disposed below and corresponds in position to a respective one of the display photodetection regions. The biometric identification apparatus may further include a storage medium (not shown) that stores a computer program, and a processor (not shown) that is being controlled to execute the computer program stored in the storage medium. For instance, when the biometric identification apparatus is used for identifying fingerprint, a pixel thin film circuit may drive turn-on of the photodetection sensors when a turn-on signal is received from the processor, or may drive turn-off of the photodetection sensors when a turn-off signal is received from the processor.

When the number of the display photodetection regions of the LED display member 52 and the number of the photodetection films 2 are respectively exemplified to be two, the display photodetection regions may be respectively located on top and bottom of the LED display member 52, or may be respectively located at left and right sides of the LED display member 52. More specifically, each of the photodetection films 2 is disposed beneath a respective one of the display photodetection regions. The photodetection films 2 are turned on and turned off by the turn-on and turn-off signals inputted by the user. In one form, the display photodetection regions cooperatively cover the entire area of the LED display member 52, so that all of the light passing through the display photodetection regions of the LED display member 52 can be absorbed by the photodetection films 2. The photodetection films 2 may be controlled in such a manner that, one of the photodetection films 2 is turned on and the other one of the photodetection films 2 is turned off.

To sum up, by virtue of the design of the cover unit 5, the optical adhesive film 4 and the optical member 3, the photodetection-film incident light having high resolution and accuracy can be received and detected by the photodetection film 2.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A biometric identification apparatus, comprising:
   a light-transmissible plate, a light filtering module, a display member and a photodetection member;
   wherein said display member is configured to emit light, and the light is reflected by a surface of said light-transmissible plate to form an original reflected light;

wherein said light filtering module is configured to filter the original reflected light to obtain a light with a traveling direction in a predetermined angle range, and said photodetection member is configured to receive the light filtered by said light filtering module;

wherein said light filtering module includes an optical member; and wherein said optical member is configured to filter out a portion of the original reflected light with an incidence angle on a surface of said optical member smaller than a second critical angle, so as to obtain a second reflected light, the second reflected light is received by said photodetection member, and the second critical angle is a minimum incident angle at which the light emitted by said display member is totally reflected by said surface of said light-transmissible plate.

2. The biometric identification apparatus according to claim 1, wherein said surface of said light-transmissible plate is configured to be touched with an object to be identified.

3. The biometric identification apparatus according to claim 1, wherein said optical member is selected from a shielding-type optical element and a phase variation optical element, said shielding-type optical element being selected from a periodical pinhole array and a non-periodical pinhole array, said phase variation optical element having a structure selected from a photonic crystal structure with a refractive index varied periodically, a microlens array structure with a refractive index varied periodically, an incident light-scattered crystal structure with a refractive index varied non-periodically, and an incident light-diffused crystal structure with a refractive index varied non-periodically.

4. The biometric identification apparatus according to claim 3, further comprising a processing chip electrically connected to said display member and said photodetection member, wherein said display member includes a plurality of display pixels, and said processing chip is configured to reconstruct a physiological characteristics image based on the second reflected light signal received by said photodetection member, the second reflected light signal being corresponding to the light emitted by one or more of a plurality of groups of single display pixels of said display member or one or more of a plurality of groups of display pixel arrays of the display member.

5. The biometric identification apparatus according to claim 4, wherein each group of single display pixels includes multiple display loudness or each group of display pixel array includes multiple display loudness.

6. The biometric identification apparatus according to claim 1, wherein said optical member is designed according to digital holography.

7. The biometric identification apparatus according to claim 1, further comprising a processing circuitry, wherein said processing circuitry is configured to generate physiological characteristic image information according to the light received by said photodetection member.

8. The biometric identification apparatus according to claim 1, wherein said photodetection member includes a plurality of photodetection regions arranged in an array, and each of said photodetection regions is provided with a pixel thin film circuit and a photodetection sensor.

9. The biometric identification apparatus according to claim 8, wherein said photodetection sensor of each of said photodetection regions includes a photodetection transistor, said photodetection transistor includes a source, a drain and a semiconductor layer, a leakage current channel is formed between the source and the drain, and said semiconductor layer is disposed in said leakage current channel.

10. A biometric identification apparatus, comprising:
a light-transmissible plate, a light filtering module, a display member and a photodetection member;

wherein said display member is configured to emit light, and the light is reflected by a surface of said light-transmissible plate to form an original reflected light;

wherein said light filtering module is configured to filter the original reflected light to obtain a light with a traveling direction in a predetermined angle range, and said photodetection member is configured to receive the light filtered by said light filtering module;

wherein said light filtering module includes a first optical member and a second optical member;

wherein said first optical member is configured to filter out a portion of the original reflected light with an incidence angle on a surface of said first optical member greater than a first critical angle, so as to obtain a first reflected light, and the first critical angle is a minimum incident angle at which the original reflected light is totally reflected by said surface of said first optical member; and wherein said second optical member is configured to filter out a portion of the first reflected light with an incidence angle on a surface of said second optical member smaller than a second critical angle, so as to obtain a second reflected light, and the second critical angle is a minimum incident angle at which the light emitted by said display member is totally reflected by said surface of said light-transmissible plate.

11. The biometric identification apparatus according to claim 10, wherein said surface of said first optical member is an interface between said first optical member and said display member.

12. The biometric identification apparatus according to claim 10, wherein said surface of said second optical member is an interface between said first optical member and second optical member.

13. The biometric identification apparatus according to claim 10, wherein said second optical member is selected from a shielding-type optical element and a phase variation optical element, said shielding-type optical element being selected from a periodical pinhole array and a non-periodical pinhole array, said phase variation optical element having a structure selected from a photonic crystal structure with a refractive index varied periodically, a microlens array structure with a refractive index varied periodically, an incident light-scattered crystal structure with a refractive index varied non-periodically, and an incident light-diffused crystal structure with a refractive index varied non-periodically,
said first optical member including an optical adhesive layer.

14. The biometric identification apparatus according to claim 10, wherein said second optical member is designed according to digital holography.

15. The biometric identification apparatus according to claim 10, wherein said first optical member includes an optical adhesive layer.

16. The biometric identification apparatus according to claim 10, further comprising a processing circuitry, wherein said processing circuitry is configured to generate physiological characteristic image information according to the light received by said photodetection member.

17. The biometric identification apparatus according to claim 10, wherein said photodetection member includes a plurality of photodetection regions arranged in an array, and each of said photodetection regions is provided with a pixel thin film circuit and a photodetection sensor.

18. A biometric identification apparatus, comprising:
a light-transmissible plate, a light filtering module, a display member and a photodetection member;
wherein said display member is configured to emit light, and the light is reflected by a surface of said light-transmissible plate to form an original reflected light;
wherein said light filtering module is configured to filter the original reflected light to obtain a light with a traveling direction in a predetermined angle range, and said photodetection member is configured to receive the light filtered by said light filtering module;
wherein said light filtering module includes an optical member; and
wherein said optical member is configured to filter out a portion of the original reflected light with an incidence angle on a surface of said optical member greater than a first critical angle, so as to obtain a first reflected light, the first reflected light is received by said photodetection member and the first critical angle is a minimum incident angle at which the original reflected light is totally reflected by said surface of said optical member.

19. The biometric identification apparatus according to claim 18, wherein said surface of said optical member is an interface between said optical member and said display member.

20. The biometric identification apparatus according to claim 18, wherein said optical member includes an optical adhesive layer.

21. The biometric identification apparatus according to claim 18, further comprising a processing circuitry, wherein said processing circuitry is configured to generate physiological characteristic image information according to the light received by said photodetection member.

22. The biometric identification apparatus according to claim 18, wherein said photodetection member includes a plurality of photodetection regions arranged in an array, and each of said photodetection regions is provided with a pixel thin film circuit and a photodetection sensor.

* * * * *